Figure 1:
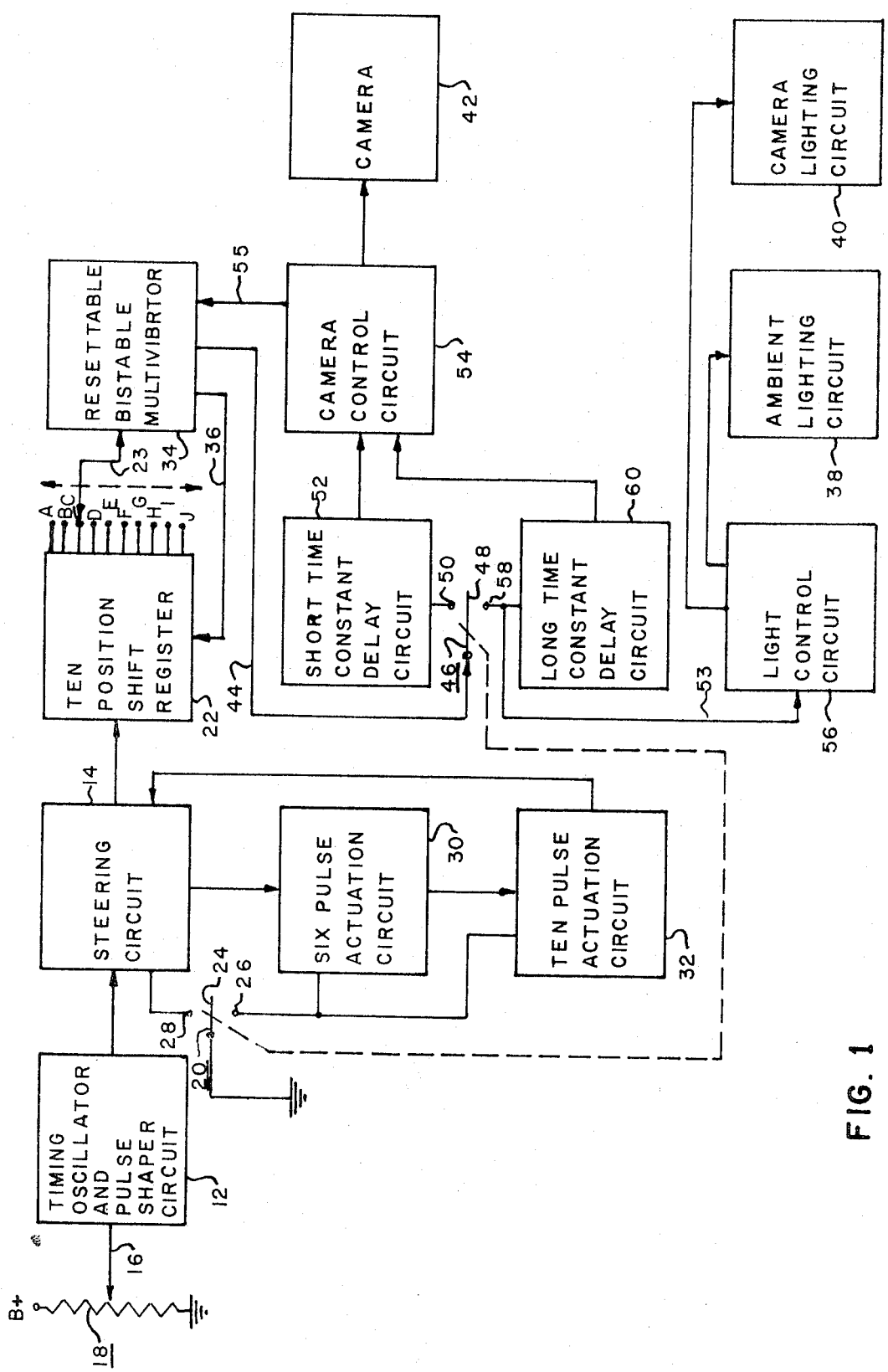

United States Patent [19]
Van Derwater, Jr.

[11] 3,790,262
[45] Feb. 5, 1974

[54] CAMERA CONTROL SYSTEM
[75] Inventor: Glen A. Van Derwater, Jr., Penfield, N.Y.
[73] Assignee: Photographic Sciences Corporation, Rochester, N.Y.
[22] Filed: May 9, 1972
[21] Appl. No.: 251,778

[52] U.S. Cl. .................................. 352/84, 95/11.5
[51] Int. Cl. ........................................... G03b 21/32
[58] Field of Search ...... 352/84, 121; 95/11.5, 12.5; 307/293; 328/129

[56] References Cited
UNITED STATES PATENTS
| | | | |
|---|---|---|---|
| 2,970,226 | 1/1961 | Skelton et al. | 307/293 |
| 3,660,692 | 5/1972 | Bartlett | 307/293 |
| 2,156,440 | 5/1939 | Veber | 352/84 |

Primary Examiner—Richard L. Moses
Attorney, Agent, or Firm—Barry Jay Kesselman

[57] ABSTRACT

A camera control system for time lapse photography includes an adjustable frequency timing oscillator coupled through a steering circuit to a shift register. The shift register has a pluarity of output terminals which are sequentially energized in response to input signals from the steering circuit. A control circuit is connected to a selected register output terminal and controls the operation of a camera function, in addition to the ambient lighting and camera lighting when the selected terminal is energized. The steering circuit and an associated pulse actuation circuit are adjustable for two modes of operation. In the first mode of operation, an input signal is applied to the shift register for every cycle of the oscillator output signal, and in the second mode of operation, an input signal is applied to the shift register for every sixty cycles of the oscillator output signal.

13 Claims, 2 Drawing Figures

CAMERA CONTROL SYSTEM

The present invention relates to a camera control system and more particularly to a camera control system for time lapse photography.

In time lapse photography, a camera is periodically operated to photograph a subject. The period or time between successive camera operations may vary greatly from one application to another. Moreover, for many applications, the period between successive camera operations must remain constant regardless of the selected period between operations, be it very long or very short.

Camera lights for illumination are necessary in many instances to properly photography certain subjects. In time lapse photography, when the period or time between successive camera operations is long, it is desirable that the camera lights used to illuminate a subject be turned on immediately prior to a camera operation and be turned off immediately after a camera operation. It is also desirable that the ambient or "house" be simultaneously controlled to turn off when the camera lights are turned on and to turn on when the camera lights are turned off.

Prior art camera control systems for time lapse photography have provided some of the functions described above (See U.S. Pat. Nos. 1,759,630; 2,156,440; and 2,970,226). Nevertheless, these prior art camera control systems are either mechanical and complex or do not provide any functions desirable in time lapse photography.

It is an object of the present invention to provide a camera control system for time lapse photography where the period between successive camera operations can be adjusted over a wide time range.

It is another object of the present invention to provide a camera control system for time lapse photography having control over the camera and ambient lighting.

It is still another object of the present invention to provide a simple and reliable electronic camera control system which has great flexibility in its modes of operation.

With these and other objects in view, a camera control system embodying the present invention includes a timing oscillator providing a train of output clock pulses for the control system. First means are provided for adjustment of the oscillator pulses over a range of frequencies. A third means is coupled between the timing oscillator and a second means. The second means has a pluraity of output terminals which are sequentially energized in response to input pulses. The third means has two modes of operation. In the first mode of operation, a pulse signal is applied to the second means for every clock pulse. In the second mode of operation, a pulse signal is applied to the second means after a predetermined number of clock pulses. A fourth means is connected to a selected one of the second means output terminals for controlling the operation of a camera when the selected terminal is energized.

Figure 2:
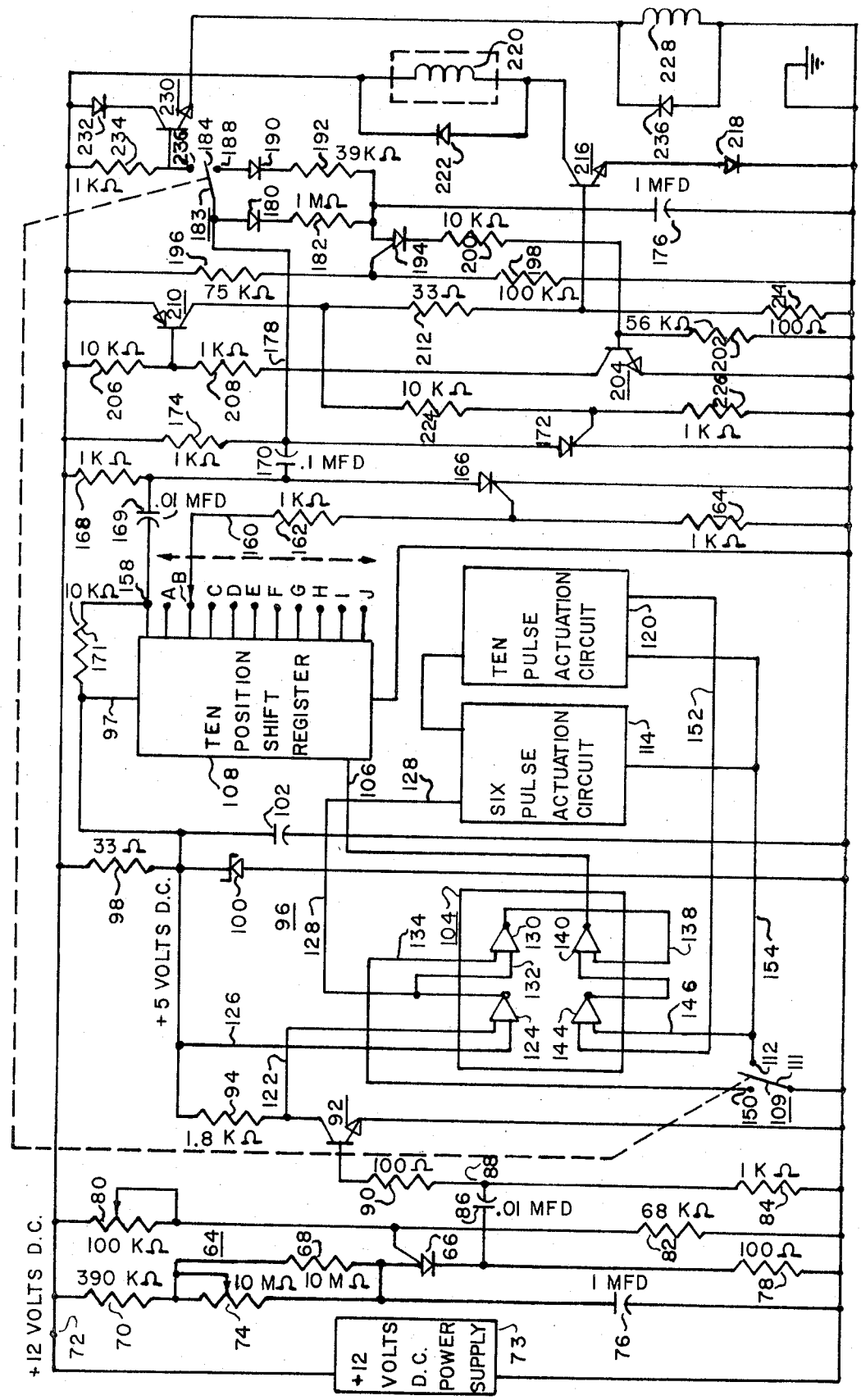

The novel features of the present invention are set forth with particularity in the appended claims. The invention, both as to its organization and manner of operation, may best be understood by reference to the following description, when taken in conjunction with the accompanying drawings, in which:

FIG. 1 is a block diagram of a camera control system embodying the present invention; and FIG. 2 is a schematic circuit diagram, partly in block form, of the camera control system shown in FIG. 1.

Reference is now made to FIG. 1. A timing oscillator and pulse shaper circuit 12 provides output pulses to a steering circuit 14. The frequency of the output pulses is controlled by adjusting the setting of tap 16 of variable potentiometer 18. The frequency of the pulses can be varied between approximately 0.20 hertz to 2.0 hertz depending upon the position of tap 16. Thus, by adjusting the setting of tap 16 the occurence of output pulses from the timing oscillator and pulse shaper circuit 12 can be made to vary between approximately 0.50 seconds to 5.0 seconds.

The operation of steering circuit 14 is controlled by a switch 20. The steering circuit 14 functions to apply pulses to a 10 position shift register 22. In a first mode of operation, when the switch contact 24 engages terminal 26, the steering circuit 14 applies a pulse to the ten position shift register 22 for each output pulse from the timing oscillator and pulse shaper circuit 12. In a second mode of operation, when the switch contact 24 engages terminal 28, the steering circuit 14 applies a pulse to the 10 position shift register 22 after a predetermined number of output pulses occur from the timing oscillator and pulse shaper circuit.

In the second mode of operation, the steering circuit 14 applies a pulse to a six pulse activation circuit 30 for each output pulse from the timing oscillator and pulse shaper circuit 12. After six pulses are applied to the six pulse actuation circuit 30, the pulse actuation circuit 30 applies a pulse to a 10 pulse actuation circuit 32. In a manner similar to the operation of the pulse actuation circuit 30, after 10 pulses have been applied to the 10 pulse actuation circuit 32, circuit 32 applies a pulse to the steering circuit 14 which in turn applies a pulse to the 10 position shift register 22. The second mode of operation of the steering circuit 14, enables pulses to be applied to the 10 position shift register 22 with an occurence which can be varied (by adjusting the setting of tap 16 on potentiometer 18) between approximately 0.50 to 5.0 minutes.

In either the first or the second mode of operation of the steering circuit 14, pulses are applied to the 10 position shift register 22. Every time a pulse is applied to the 10 position shift register 22 a different one of the 10 register output terminals A-J is energized. The terminals are energized sequentially beginning with the terminal A and ending with the terminal J.

A selected one of the 10 output terminals A-J of the ten position shift register 22 is connected through tap 23 to a resettable bistable multivibrator 34. When the selected terminal is energized the multivibrator changes states from its initial condition and applies a reset pulse via lead 36 to the 10 position shift register 22. The reset pulse resets the register to a zero count such that the first pulse applied to the register from the steering circuit 14 will cause register terminal A to be energized. Subsequent pulses applied to the shift register 22 cause the output terminal B-J to be sequentially energized until a reset pulse is applied via lead 36 to the 10 position shift register.

By selecting the output terminal of the register 22 connected to the bistable multivibrator 34, the occurence of the change in state of the multivibrator can be made to vary by a factor of ten from the occurence of output pulses from the steering circuit 14. Thus, where the steering circuit 14 is in the first mode of operation, pulses are applied to the register 22 with an occurence of between approximately 0.5 to 5.0 seconds. By also selecting the output terminal of the register 22, the bistable multivibrator changes state at any time between 0.50 and 50 seconds. Where the steering circuit 14 is in the second mode of operation, pulses are applied to the ten position shift register 22 with an occurence of between approximately 0.50 and 5.0 minutes. The selection of the output terminal A-J of the shift register 22 enables the multivibrator to change states anywhere between 0.50 and 50 minutes. Consequently, by selection of the mode operation of the steering circuit 14, the frequency of operation of the timing oscillator and pulse shape circuit 12, and the output terminal A-J of the 10 position shift register 22, the resettable bistable multivibrator 34 can be made to change states, with any of an infinite number of adjustments for time intervals between occurences from a minimum of approximately 0.50 seconds to a maximum of 50 minutes. For any given adjustment, the time intervals between successive occurences are equal. The change in state of the resettable bistable multivibrator 34 functions to control ambient lighting circuits 38, camera lighting circuits 40, and camera 42, as will be more fully explained hereinafter.

When the bistable multivibrator changes states, a voltage is applied via lead 44 to a switch 46. The switch 46 is ganged to the switch 20 for unicontrol. When the switch 20 has its contact 24 engaging terminal 26 (steering circuit conditioned for first mode of operation). contact 48 of switch 46 engages terminal 50. When a voltage develops on lead 44, it is applied through switch 46 to a short time constant delay circuit 52. After a short time delay, for example, 0.1 second, a signal is applied to a camera control circuit 54. The camera control circuit functions to control one or more operations in the camera 42. Application of the signal to the camera control circuit may energize a solenoid which is connected to trip the camera shutter. Additional operations such as distance settings for the camera lenses, and diameter settings of the lens aperture may also be controlled. A reset signal is coupled via lead 55 from the camera control circuit to the resettable multivibrator 34. The reset signal is generated every time a signal is applied to the camera control circuit 54 and resets the bistable multivibrator to its initial condition.

A light control circuit 56 operates to control ambient lighting circuits 38 and camera light circuits 40. The ambient lighting circuits 38 control the ambient lighting in the vicinity of subject to be photographed by camera 42. The camera lighting circuits 40 control the illumination of the subject to be photographed when the camera shutter is tripped. The light control circuit 56 controls the circuits 38 and 40 such that either the ambient lighting circuits 38 are energized or the camera lighting circuits 40 are energized. With switch contact 48 engaging terminal 50 and the camera 42 operated with an occurence of between approximately 0.50 to 50 seconds, the camera lighting circuits 40 are continuously energized and the ambient lighting circuits 38 are deenergized.

Switch contact 48 engages switch terminal 58 when the switch contact 24 of ganged switch 20 engages switch terminal 28 (steering circuit conditioned for the second mode of operation). A change in state in the bistable multivibrator from its initial condition causes a voltage to be applied to a long time constant delay circuit 60 through lead 44 and switch 46. After a time delay, for example 1.0 second, a signal is applied to the camera control circuit 54 which functions in the manner described above.

With switch contact 48 engaging terminal 58, the voltage which develops on lead 44 is also applied through switch 46 and lead 53 to light control circuit 56. In this mode, the camera is operated with an occurrence of between approximately 0.50 to 50 minutes. The camera lighting circuits 40 are energized and ambient lighting circuits 38 are deenergized shortly before the camera is operated. It should be noted, however, that with switch contact 48 engaging switch terminal 58 and the resettable bistable multivibrator 34 in its initial condition, the light control circuit 56 is conditioned to cause the ambient lighting circuits 38 to be continuously energized and the camera lighting circuits to be deenergized.

Once the reset signal is applied to the bistable multivibrator 34, the multivibrator is reset to its initial condition. The resetting of the multivibrator to its initial condition causes the light control circuit 56 to be conditioned to cause the ambient lighting circuit 38 to again be energized and the camera lighting circuits 40 to be deenergized.

Reference is now made to FIG. 2. A timing oscillator 64 includes a unijunction device 66 (such as Unitrode Corporation unijunction transistor type U13T3). The anode of the device 66 is coupled through a resistor 68 and a resistor 70 to a terminal 72. Terminal 72 is conected to a +12 volt DC power supply 73. A series connected variable resistor 74 and capacitor 76 are coupled between the junction of resistors 68 and 70 and a point of fixed reference potential, shown as ground. The anode of the device 66 is also coupled to the junction of resistor 74 and capacitor 76. A resistor 78 couples the cathode of device 66 to ground. The junction of a variable resistor 80 and resistor 82 is connected to the gate electrode of the device 66. The variable resistor 80 and resistor 82 are coupled between the +12 volt DC power supply 73 and ground and establish the voltage level at the gate electrode of device 66.

The voltage at the gate electrode of device 66 determines the voltage necessary at the anode to initiate conduction. When capacitor 76 charges to a sufficient level, device 66 is biased into conduction, and the capacitor discharges through the anode-cathode electrode current path and resistor 78. The charge path for capacitor 76 is from the power supply 73 through resistor 70 and the parallel connected variable resistor 74 and resistor 68. The variable resistor 80 provides a factory adjustment to calibrate the setting of the variable resistor 74 which is a user control. With the variable resistor 74 set for minimum resistance, variable resistor 80 is adjusted so that device 66 is biased into conduction every 0.5 second. With variable resistor 80 set as described above, adjustment of variable resistor 74 for maximum resistance will cause device 66 to be biased into conduction approximately every 5.0 seconds.

After device 66 is biased into conduction, as capacitor 76 discharges, a voltage develops across resistor 78. The voltage across resistor 78 is applied to the differentiating circuit including the resistor 84 and capacitor 86. Spike voltages which develop at junction 88 are coupled by resistor 90 to the base electrode of transistor 92. The emitter electrode of transistor 92 is directly connected to ground, and the collector electrode is connected through resistor 94 to a regulated +5 volt DC power supply 96 which operates off the +12 volt DC power supply 73.

The +5 volt DC power supply 96 includes a resistor 98 and zener diode 100 connected in series between terminal 72 and ground. Voltage variations occurring at the junction of resistor 98 and zener diode 100 are filtered out by capacitor 102.

Transistor 92 and its associated circuitry form a pulse shaping circuit which converts the positive spike voltage at junction 88 to negative going pulses which are coupled to a steering circuit 104. Steering circuit 104 is composed of four NAND gates. One suitable integrated circuit having four NAND gates is a Signetic Corporation integrated circuit type N7400A. Integrated circuits of this type are described in a Signetic publication entitled, "DIGITAL 54/7400 TTL," Copyright 1971.

The steering circuit 104 functions to achieve the same operation as described above in connection with FIG. 1. Briefly, steering circuit 104 applies pulses via lead 106 to a 10 position shift register 108. One suitable integrated circuit for the 10 position shift register 108 is a Signetic Corporation integrated circuit type N8202. Integrated circuits of this type are described in a Signetic's publication entitled, "DIGITAL 8000 Series TTL/MSI," Copyright 1971. Pulses are applied to lead 106 every time device 66 is biased into conduction or once every 60 times device 66 is biased into conduction, depending on the position of a switch 109.

With the contact 111 of switch 109 engaging switch terminal 112, six pulse actuation circuit 114 and 10 pulse actuation circuit 120 are inhibited from operating. The six pulse actuation circuit 114 may be a Signetic Corporation integrated circuit type N8288A, and the ten pulse actuation circuit 120 may be a Signetic Corporation integrated circuit type N8280A. Both the N8288A and the N8280A integrated circuits are described in the Signetic's publication, "DIGITAL 8000 Series TTL/MSI," supra. The circuit 114 functions as a divide by six circuit and the circuit 120 functions as a divide by 10 circuit. The six pulse and 10 pulse actuation circuits 114 and 120 combine, when not inhibited, to form a divide by 60 circuit, providing one output pulse for every 60 input pulses.

With both pulse actuation circuits 114 and 120 inhibited, negative pulses are applied from the collector electrode of transistor 92 via lead 122 to NAND gate 124. A positive voltage is also applied to NAND gate 124 via lead 126. NAND gate 126 provides a positive output pulse every time a negative input pulse is applied via lead 122. The NAND gate 124 functions as an inverter for the negative going pulses at the collector electrode of transistor 92. The positive pulses at the output of NAND gate 124 are applied both to six pulse actuation circuit 114 over lead 128 and to NAND gate 130 via lead 132. Since the operation of circuits 114 and 120 are inhibited, the pulse applied via lead 128 actuation circuit 114 has no effect on the operation of the camera control system.

One input to NAND gate 130 is by means of lead 134 which is open circuited when the switch contact 111 engages switch terminal 112. An open circuit for NAND gates of this type is the equivalent of a positive voltage. Consequently, for each positive going pulse occurring at the output of NAND gate 124, NAND gate 130 provides a negative going pulse output signal which is coupled via lead 138 to NAND gate 140. A positive voltage is applied to the other input to NAND gate 140 from the output of NAND gate 144. The output voltage of NAND gate 144 is held positive by grounding one of the inputs to the gate through lead 146, switch terminal 112 and switch contact 111. Thus, every time a negative going pulse occurs on lead 138, a positive pulse is applied from output terminal of NAND gate 140 over lead 106 to the ten position shift register 107.

With switch contact 111 engaging switch terminal 150, the pulse actuation circuits are no longer inhibited and for every sixty pulses applied to circuit 114 via lead 128 a positive voltage is generated in the 10 pulse actuation circuit and applied over lead 152 to NAND gate 144. The other input to NAND gate 144 is maintainted at a positive voltage from circuits 114 and 120 via lead 154. Therefore, a positive pulse applied to NAND gate 144 over lead 152 causes a negative going pulse to develop at the output terminal of the gate.

The negative going pulse at the output terminal of NAND gate 144 is applied to NAND gate 140. The other input to NAND gate 140 is maintained positive by the output of NAND gate 130. With switch contact 108 engaging switch terminal 150, one input to NAND gate 130 is grounded. Consequently, the output voltage from NAND gate 130 is maintained positive.

The 10 position shift register 108 is coupled to the +5 volt power supply 96 by lead 97. The register has 10 output terminals A-J which are sequentially energized. Starting with a zero count, the trailing edge or negative going portion of a positive voltage pulse occurring on lead 106 causes register output terminal A to be energized. A second pulse on lead 106 causes register output terminal B to be energized. The energization of the register output terminals continue sequentially until a reset voltage is applied to the ten position shift register reset terminal 158.

A tap 160 is adjustable between the register output terminals A-J. When the selected terminal to which tap 160 is connected becomes energized, a positive voltage develops at the junction of resistors 162 and 164 and is applied to the gate electrode of normally nonconducting silicon controlled rectifier (SCR) 166. The positive voltage at the gate electrode of SCR 166 biases the device into conduction and current flows through resistor 168 and the anode-cathode electrode current path. As the anode electrode of SCR 166 drops toward ground potential, a spike voltage develops at the junction of capacitor 169 and resistor 171. The spike voltage is applied to reset terminal 158 and causes the 10 position shift register 108 to be reset to the zero count. Simultaneously, as the anode of SCR 166 drops toward ground potential, one side of capacitor 170 is connected to ground and a negative voltage pulse develops at the anode of SCR 172, biasing the device out of conduction.

When SCR 172 becomes nonconducting, current ceases to flow from the +12 volt power supply 73 to ground through resistor 174 and the anode-cathode electrode current path of SCR 172, and a positive voltage develops at the anode of the device. The positive voltage at the anode of SCR 172 is coupled to a capacitor 176 via lead 178, diode 180 and resistor 182. The anode electrode of SCR 172 is also coupled to capacitor 176 through switch 183 (when switch contact 184 engages switch terminal 188). diode 190 and resistor 192.

Switch 183 is ganged to switch 109 for unicontrol. When switch 183 is conditioned with switch contact 183 engaging switch terminal 188, switch 109 is conditioned to inhibit operation of the six pulse actuation circuit 114 and the 10 pulse actuation circuit 120.

With switch contact 184 engaging switch terminal 188, a short time constant is provided in charging capacitor 176. The time constant is approximately 0.1 second. When capacitor 176 charges to a predetermined voltage level, a unijunction device such as a unitrode Corporation type U13T2 is biased into conduction. The predetermined voltage level is determined by the voltage applied to the gate electrode of device 194 by the voltage divider resistors 196 and 198.

When device 194 becomes biased for conduction, capacitor 176 discharges toward ground potential through the anode-cathode electrode current path of device 194, resistor 200, and resistor 202. As capacitor 176 discharges, transistor 204 is biased into conduction, and the voltage at the junction of resistors 206 and 208 drops to a level such that transistor 210 is biased into conduction.

A current flows through conducting transistor 210 and the series connected resistors 212 and 214. The voltage developed at the junction of resistors 212 and 214 is applied to the base electrode of a transistor 216, biasing the transistor for conduction. The collector-emitter electrode current path of transistor 216, diode 218 and solenoid winding 220 are connected in series between the +12 volt power supply 73 and ground. A diode 222 is connected in parallel with the solenoid winding to prevent possible damage to the winding from transient voltages generated during operation of the solenoid. When transistor 216 is biased for conduction, current flows through the solenoid winding 220, and the solenoid, not shown, operates the desired camera function as described above in connection with FIG. 1.

Conduction of transistor 210 also causes a current to flow through series connected resistors 224 and 226. The voltage developed at the junction of the resistors is applied to the gate electrode of SCR 172. SCR 172 becomes biased into conduction, and one side of capacitor 170 is connected to ground through the conducting device 172. This causes a negative pulse to develop at the anode of SCR 166 biasing the device out of conduction. It should be recognized that SCR 166 and SCR 172 with their associated circuitry form a resettable bistable miltivibrator. When the bistable miltivibrator is reset to its initial condition, the conduction condition of SCR 166 and 172 before energization of the selected register output terminal is reestablished; SCR 166 is biased out of conduction and SCR 172 is biased for conduction.

The ambient lighting circuits and the camera lighting circuits are controlled by a relay. When current flows through the relay winding 228 the relay contacts, not shown, are operated to deenergize the ambient lighting circuits and energize the camera lighting circuits. Current flow through the relay winding is controlled by a transistor 230. A diode 232, the collector-emitter electrode current path and relay winding 228 are connected in series between the +12 volt DC power supply 73 and ground. Wijh switch contact 184 engaging switch terminal 188, transistor 230 is biased for conduction by the voltage applied to its base electrode through resistor 234. A diode 236 is connected in parallel with relay winding 228 to prevent damage from transient voltages generated during operation of the relay.

Switch contact 184 engages switch terminal 236, when switch 109 is conditioned such that the six pulse actuation circuit 114 and ten pulse actuation circuit 120 are operating. With switch contact 184 engaging switch terminal 236, the base electrode of transistor 230 is connected to ground through the anode-cathode electrode current path of conducting SCR 172. Thus, transistor 230 is biased out of conduction.

When the selected register output terminal is energized, SCR 172 is biased out of conduction. The positive voltage at the anode of the SCR biases transistor 230 into conduction and the ambient lighting circuits become deenergized and the camera lighting circuits are energized. At this time capacitor 176 begins to charge. However, the charge path from the anode of SCR 172 for the capacitor includes diode 180 and resistor 182. Resistor 192 is not connected in the charging circuit. Consequently, capacitor 176 is charged with a long time constant circuit. Approximately 1 second is required before capacitor 176 charges to a level sufficient to bias unijunction device 194 into conduction and cause the solenoid winding 220 to be energized (in the manner previously described), thus, operating the camera function being controlled. Once the solenoid winding 220 has been energized, SCR 172 is again biased into conduction and transistor 230 is biased out of conduction. When transistor 230 becomes nonconducting the ambient lighting circuits are energized and the camera lighting circuits are deenergized.

What is claimed is:

1. In a time lapse photography system of the type providing control of a camera function, a camera control system, comprising:
    a timing oscillator providing a train of output clock pulses for said control system;
    first means for adjusting the frequency of said clock pulses over a range of frequencies;
    second means having a plurality of output terminals sequentially energized in response to input pulses;
    third means coupled between said timing oscillator and said second means, said third means having a first mode of operation where a pulse signal is applied to said second means for every generated clock pulse, and a second mode of operation where a pulse signal is applied to said second means after a predetermined number of generated clock control pulses; and
    fourth means coupled to a selected one of said second means output terminals for controlling said camera operation.

2. A camera control system as defined in claim 1 where said predetermined number of generated clock pulses is 60.

3. A camera control system as defined in claim 2 said range of frequencies over which said clock pulses are adjustable is such that in said first mode of operation, said camera operation can be caused to occur over a first time range of approximately 0.5 seconds to 50 seconds, and in said second mode of operation, said camera operation can be caused to occur over a second time range of approximately 0.5 to 50 minutes.

4. A camera control system as defined in claim 1 wherein said fourth means controls camera lighting and energizes said camera lighting immediately prior to operation of said camera function and deenergizes said camera lighting immediately after operation of said camera function when said third means is in said second mode of operation.

5. A camera control system as defined in claim 4 wherein said fourth means controls ambient lighting and deenergizes said ambient lighting immediately prior to operation of said camera function and energizes said ambient lighting immediately after operation of said camera function when said third means is in said second mode of operation.

6. A camera control system as defined in claim 5 wherein said fourth means continuously energizes said camera lighting and continuously deeenergizes said ambient lighting when said third means is in said first mode of operation.

7. A camera control system, comprising:
a timing oscillator;
control means for controlling the operating frequency of said timing oscillator;
a shift register having a plurality of output terminal sequentially energized in response to input signals;
a steering circuit coupled between said timing oscillator and said shift register;
pulse actuation means for providing an output pulse in response to a predetermined number of input pulses, said pulse actuation means coupled to said steering circuit;
switch means connected to said pulse actuation means and said steering circuit for conditioning said system for a first mode of operation such that siad steering circuit applied an input signal to said shift register for each output pulse from said timing oscillator and a second mode of operation such that said steering circuit applies an input signal to said register after a predetermined number of output pulses from said timing oscillator;
a camera control circuit for controlling the operation of a camera function; and
means coupled between said camera control circuit and a selected one of said plurality of register output terminals for causing said camera control circuit to operate said camera function when said selected terminal is energized.

8. A camera control system as defined in claim 7 including a light control circuit connected to said coupling means, said light control circuit controlling the energization of camera lighting circuits and ambient lighting circuits.

9. A camera control system as defined in claim 8 wherein said light control circuit energizes said camera lighting circuits immediately prior to operation of said camera function and deeenergizes said camera lighting circuits immediately after operation of said camera function when said switch means conditions said system for said second mode of operation.

10. A camera control system as defined in claim 9 wherein said light control circuit deenergizes said ambient lighting circuits immediately prior to operation of said camera function and energizes said ambient lighting circuits immediately after operation of said camera function when said switch means conditions said system for said second mode of operation.

11. A camera control system as defined in claim 8 wherein said light control circuit continuously energizes said camera lighting circuits and continuously deenergizes said ambient lighting circuits when said switch means conditions said system for said first mode of operation.

12. A camera control system as defined in claim 11 wherein the minimum period for successive operations of said camera function when said switch means conditions said system for each first mode of operation is less than 1 second.

13. A camera control system as defined in claim 7 wherein said predetermined number of output pulses from said timing oscillator is 60.

* * * * *